United States Patent
Ruppert

(10) Patent No.: US 8,194,903 B2
(45) Date of Patent: Jun. 5, 2012

(54) HEARING APPARATUS WITH BATTERY COMPARTMENT LOCKING

(75) Inventor: Josef Ruppert, Kleinsendelbach (DE)

(73) Assignee: Siemens Medical Instruments Pte. Ltd., Singapore (SG)

(*) Notice: Subject to any disclaimer, the term of this patent is extended or adjusted under 35 U.S.C. 154(b) by 654 days.

(21) Appl. No.: 12/322,982

(22) Filed: Feb. 10, 2009

(65) Prior Publication Data

US 2009/0202092 A1   Aug. 13, 2009

(30) Foreign Application Priority Data

Feb. 12, 2008   (DE) .......................... 10 2008 008 668

(51) Int. Cl.
*H04R 25/00* (2006.01)
(52) U.S. Cl. ...................................... 381/323; 381/322
(58) Field of Classification Search ................. 381/322, 381/323
See application file for complete search history.

(56) References Cited

U.S. PATENT DOCUMENTS

2007/0081686 A1* 4/2007 Sluppke .................. 381/330

FOREIGN PATENT DOCUMENTS

| DE | 2503253 A1 | 7/1976 |
| EP | 0004988 A1 | 10/1979 |
| EP | 0309834 A1 | 4/1989 |
| EP | 0332938 A1 | 9/1989 |
| EP | 0674465 A1 | 9/1995 |

* cited by examiner

*Primary Examiner* — Jerome Jackson, Jr.

(57) ABSTRACT

A hearing apparatus is provided with a housing and/or frame and a battery compartment that is mounted rotatably in or on the housing or frame between an open position and a closed position. The battery compartment, radially relative to the axis of rotation, has a first locking element within the battery charger area. A second locking element that corresponds to the first locking element is arranged on the housing or frame so that the battery compartment engages removably in a specified pivoted position between the open position and the closed position.

19 Claims, 4 Drawing Sheets

HEARING APPARATUS WITH BATTERY COMPARTMENT LOCKING

CROSS REFERENCE TO RELATED APPLICATIONS

This application claims priority of German application No. 10 2008 008 668.1 DE filed Feb. 12, 2008, which is incorporated by reference herein in its entirety.

FIELD OF INVENTION

The present invention relates to a hearing apparatus with a housing and/or frame and a battery compartment that is mounted rotatably in or on the housing or frame. The term hearing apparatus is understood here to mean any sound-emitting device that can be worn on or in the ear, in particular a hearing device, a headset, a set of ear phones and the like.

BACKGROUND OF INVENTION

Hearing devices are wearable hearing apparatuses which are used to assist the hard-of-hearing. In order to accommodate numerous individual requirements, various types of hearing devices are available such as behind-the-ear (BTE) hearing devices, hearing device with external receiver (RIC: receiver in the canal) and in-the-ear (ITE) hearing devices, for example also concha hearing devices or completely-in-the-canal (ITE, CIC) hearing devices. The hearing devices listed as examples are worn on the outer ear or in the auditory canal. Bone conduction hearing aids, implantable or vibrotactile hearing aids are also available on the market. The damaged hearing is thus stimulated either mechanically or electrically.

The key components of hearing devices are principally an input converter, an amplifier and an output converter. The input converter is normally a receiving transducer e.g. a microphone and/or an electromagnetic receiver, e.g. an induction coil. The output converter is most frequently realized as an electroacoustic converter e.g. a miniature loudspeaker, or as an electromechanical converter e.g. a bone conduction hearing aid. The amplifier is usually integrated into a signal processing unit. This basic configuration is illustrated in FIG. 1 using the example of a behind-the-ear hearing device. One or a plurality of microphones 2 for recording ambient sound are built into a hearing device housing 1 to be worn behind the ear. A signal processing unit 3 which is also integrated into the hearing device housing 1 processes and amplifies the microphone signals. The output signal for the signal processing unit 3 is transmitted to a loudspeaker or receiver 4, which outputs an acoustic signal. Sound is transmitted through a sound tube, which is affixed in the auditory canal by means of an otoplastic, to the device wearer's eardrum. Power for the hearing device and in particular for the signal processing unit 3 is supplied by means of a battery 5 which is also integrated in the hearing device housing 1.

SUMMARY OF INVENTION

Batteries of a BTE or ITE hearing device are generally held in the hearing device with the aid of a battery compartment. In most cases this battery compartment is rotatable. When the battery compartment is pivoted inward the battery is located in an operational position while, when the battery compartment is pivoted outward, the battery can be removed from the hearing device.

Often a movable and/or rotatable battery compartment also serves to switch the hearing device on and off. When the battery compartment is opened, the hearing device is simultaneously switched off. Conversely the hearing device is only switched on when the battery compartment is completed closed. However, switching the hearing device on and off with the aid of the battery compartment has the disadvantage that, in the switched-off state, i.e. when the battery compartment is open, the battery can unintentionally fall out of the battery compartment. A movable battery compartment for switching the hearing device on and off also has the disadvantage that the battery compartment can easily be closed unintentionally so that the hearing device is switched on, which can lead to an undesired discharging of the battery, for example when the hearing device is set to one side.

The publication EP 0 309 834 A1 discloses a hearing device housing and a battery charger, whereby the battery charger is capable of being moved to various pivoted positions. In every pivoted position the battery charger is pressed firmly against a hinge. The disadvantage here is a relatively large resistance when rotating the battery charger.

The object of the present invention is thus to improve a hearing apparatus and in particular a hearing device such that it can be operated more reliably with reference to the battery compartment switch.

This object is achieved in accordance with the invention by means of a hearing apparatus having a housing and/or frame and a battery compartment that is mounted in or on the housing or frame, rotatably between an open position and a closed position, with the battery compartment, radially relative to the axis of rotation, having a first locking element within the battery charger area and with a second locking element that corresponds to the first locking element being arranged on the housing or frame, so that the battery compartment removably engages in a specified pivoted position between the open position and the closed position.

It is thus advantageously possible for the battery compartment to be held steady by the locking mechanism in an intermediate position between the open position and the closed position. It is thus possible at least to ensure that the battery compartment will not simply shift into the closed position.

According to an advantageous embodiment the battery compartment has a ring-shaped mounting element, at the center of which runs the axis of rotation, and which is equipped with a projection as a first locking element on its outer periphery. The housing or the frame can accordingly have a depression as a second locking element that corresponds to the projection. With a construction of this kind a locking mechanism can be realized in the axis region of the rotatable battery compartment.

In a development of the aforementioned hearing apparatus, at least one part of the depression can be realized with an elastic wall that can be moved in a spring-like manner by the projection in a radial direction relative to the axis of rotation. This capacity of the wall for spring-like movement allows for abrasion on the locking mechanism to be reduced.

In addition, the first locking element of the battery compartment can also be made of a softer plastic than the second locking element of the housing or frame. This measure reduces the abrasion speed at least on the housing or frame, since a battery compartment is considerably less expensive to replace.

Furthermore a battery can be removed from the battery compartment in an axial direction relative to the axis of rotation in a removal position of the battery compartment whereas, in the specified pivoted position in which the battery compartment is engaged, the battery is prevented from being removed from the battery compartment by a part of the housing. It is thus possible to ensure that the battery does not unintentionally fall out of the battery compartment in the engaged intermediate position. Viewed from the closed position, the battery compartment is then to be rotated via the engaged position (specified pivoted position) to the open position so that the battery can be removed.

Furthermore a third locking element can be arranged radially on the battery compartment or the housing or frame within the battery charger area in order to interact with the first or second locking element so that the battery compartment can also be engaged in a further pivoted position that differs from the specified pivoted position. Thus a locking mechanism can also be provided for example for the open position and/or the closed position of the battery compartment in the axial area of the battery compartment.

BRIEF DESCRIPTION OF THE DRAWINGS

The present invention is now described in more detail with reference to the appended drawings, in which

FIG. 8 shows the hearing device of FIG. 3 and FIG. 7 with the lower part of the housing screwed on.

DETAILED DESCRIPTION OF INVENTION

The exemplary embodiments shown in more detail below represent preferred embodiments of the present invention.

Figure 1:
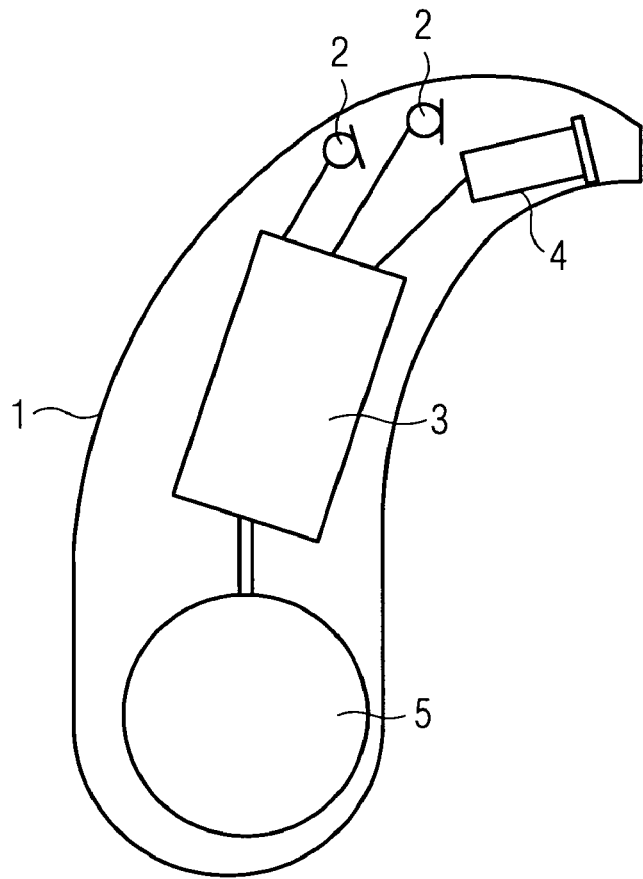
FIG. 1 shows a basic sketch of a hearing device with its key components according to the prior art.
Figure 2:
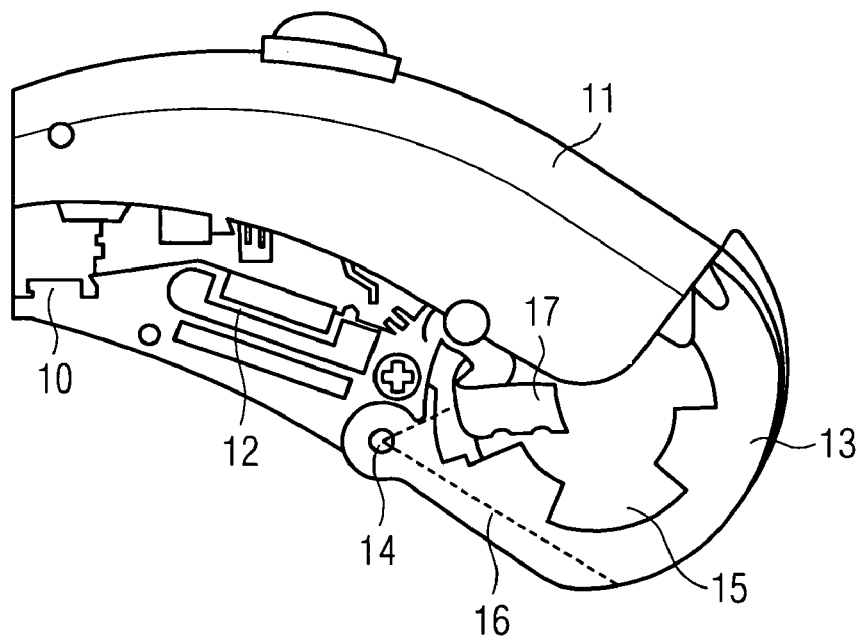
FIG. 2 shows a BTE hearing device with a battery compartment in the closed position.

FIG. 2 shows a BTE hearing device, around the frame 10 of which is attached only the upper part 11 of the housing, but not the lower part of the housing. Numerous electronic components 12 are built into the frame. Furthermore a battery compartment 13 is mounted rotatably on the frame at an axis of rotation 14. The battery compartment 13 houses a battery 15 in the form of a button cell.

The battery compartment 13 is shown in FIG. 2 in a closed position. In this closed position a straight line running in parallel to the bottom edge of the battery compartment 13 via the axis of rotation 14 defines a reference line 16.

In this closed position the contacts 17, only one of which is visible in FIG. 2, are connected with the battery 15 so that the hearing device can be supplied with power and/or is switched on. In the closed position of the battery compartment 13 described above, i.e. in the switched-on position, the battery compartment 13 is engaged with the frame 10 or a part of the housing, e.g. the upper half of the housing 11.

Figure 3:
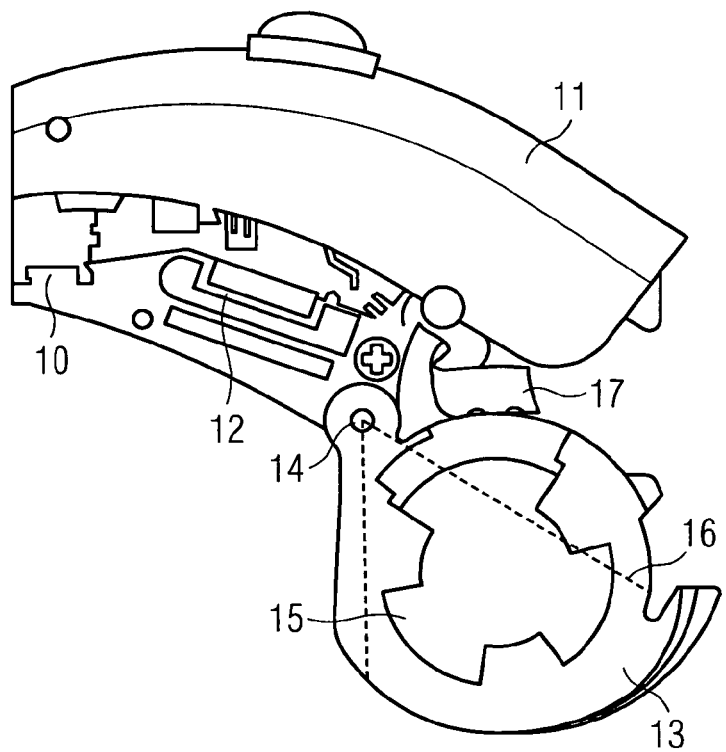
FIG. 3 shows the BTE hearing device of FIG. 2 with the battery compartment in an engaged intermediate position.

The battery compartment 13 is shown in FIG. 3 in an intermediate position. This intermediate position is characterized in that the battery compartment 13 is rotated at a specified angle relative to the closed position of FIG. 2.

In the present example the battery compartment 13 is rotated in the intermediate position by around 60°. The angle of rotation of the battery compartment 13 can be seen in FIG. 3 in relation to the reference line 16. The battery compartment 13 is engaged in this intermediate position with the frame 10.

In addition the contacts 17 are no longer connected to the battery 15, and as such the hearing device is switched off.

Figure 4:
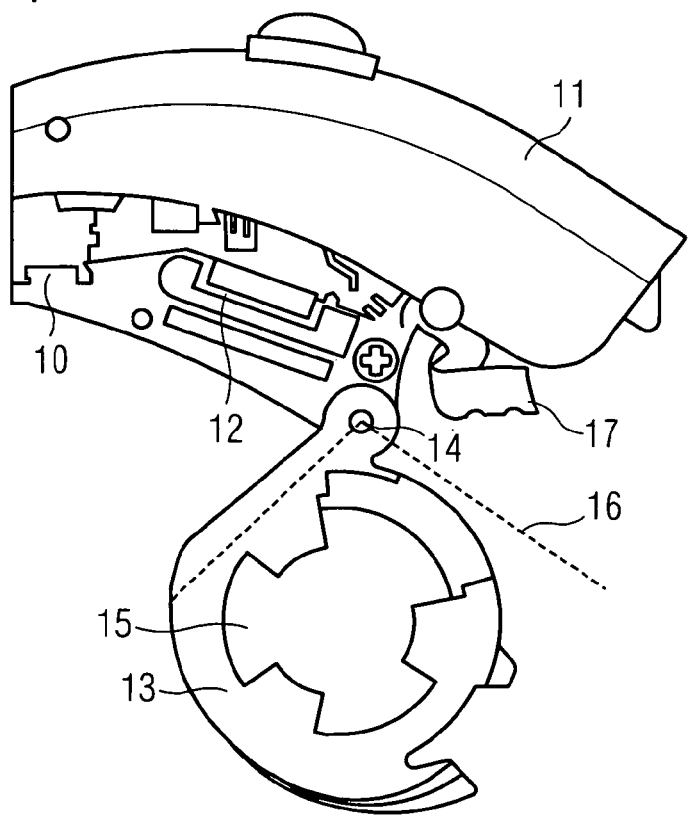
FIG. 4 shows the BTE hearing device of FIG. 2 with the battery compartment in the open position.

FIG. 4 shows the battery compartment 13 of the hearing device of FIGS. 2 and 3 in the open position. This can be seen from the fact that the battery compartment 13 is rotated here by around 100° compared to the reference line 16. This position normally corresponds to the position in which the battery 15 can be removed from the hearing device. Since the battery 15 has moved further away from the contacts 17 in this open position than in the intermediate position, the hearing device is also switched off in the open position. The battery compartment 13 may possibly also engage in this open position.

The locking mechanism for engaging the battery compartment 13 in the intermediate position will now be described in more detail with reference to the FIGS. 5 to 7. In accordance with FIG. 5 a recess 18 is provided in the frame 10. Said recess 18 has a hole 19 into which a shaft, which serves to realize the axis of rotation 14, can be inserted. A depression 20 is realized on the wall of the recess 18. The recess 18 including the hole 19 forms part of the pivot bearing on the frame 10. The locking mechanism with the depression 20 is realized close to the axis. In particular the locking mechanism is closer to the axis of rotation 14 than the battery 15 in the battery compartment 13, i.e. closer than the battery charger area that defines the space in which the battery 15 is inserted in the battery compartment 13.

Figure 6:
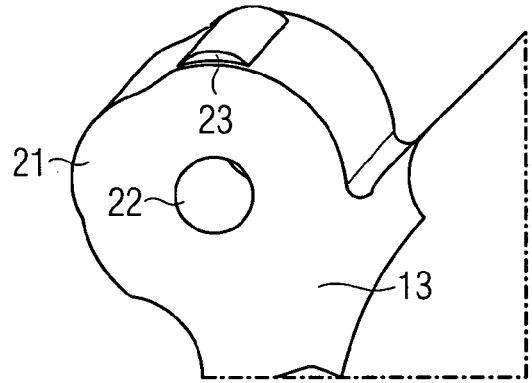
FIG. 6 shows part of the battery compartment pivot bearing on the battery compartment.

FIG. 6 reproduces the part of the pivot bearing that is on the side of the battery compartment 13. Here this part has an almost cylinder-shaped bearing housing 21 with a longitudinal hole 22 that runs axially (i.e. a ring-shaped mounting element) into which the mounting shaft can be plugged. A projection 23 is molded on to the shell of the bearing housing 21. The projection 23 corresponds to the depression 20 of the frame 10.

Figure 7:
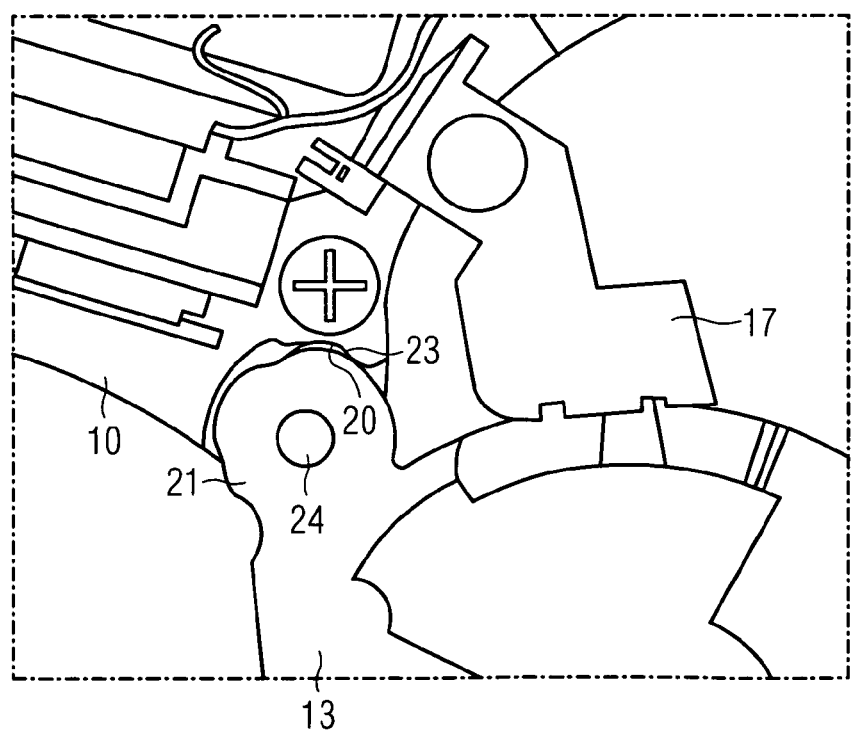
FIG. 7 shows an enlarged section of FIG. 3.

FIG. 7 shows the pivot bearing including the locking mechanism in the assembled state. The bearing housing 21 of the battery compartment 13 is mounted rotatably here with the aid of a shaft 24 in the recess 18 of the frame 10. In the intermediate position, which corresponds to the position shown in FIG. 3, the projection 23 is engaged in the depression 20. In order to move the battery compartment into the open or closed position, the projection 23 must be pushed above the raised parts to the left and right of the depression 20. This results in a certain abrasion of the locking mechanism on account of the friction. Through the use of two different plastics of differing hardnesses it is possible by means of friction to achieve greater abrasion of the battery compartment 13 than of the frame 10 or housing. For example a plastic can be used for the frame 10 that is known by the name "LCP" or the brand "Vectra". A softer plastic, for example "ABS", can then be used for the battery compartment.

The locking mechanism in the vicinity of the axis of rotation has the advantage that no locking elements need be provided in the outer region of the battery compartment 13, i.e. at a large radial distance from the axis of rotation. Consequently a hearing device that is smaller overall can be constructed in this design.

Figure 5:
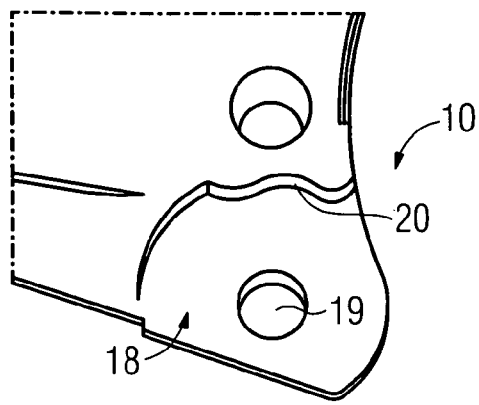
FIG. 5 shows part of the battery compartment pivot bearing on the frame of the hearing device.

The locking mechanism as shown in FIGS. 5 to 7 ensures that the battery compartment 13 is held in an intermediate position so that the hearing device cannot be switched on unintentionally. This is not the case with a battery compartment without a locking mechanism, in which case the battery compartment can accidentally be rotated into the ON position simply by moving the hearing device. Thus the battery compartment must be deliberately pushed into the ON position or closed position by exceeding the locking force.

Figure 8:
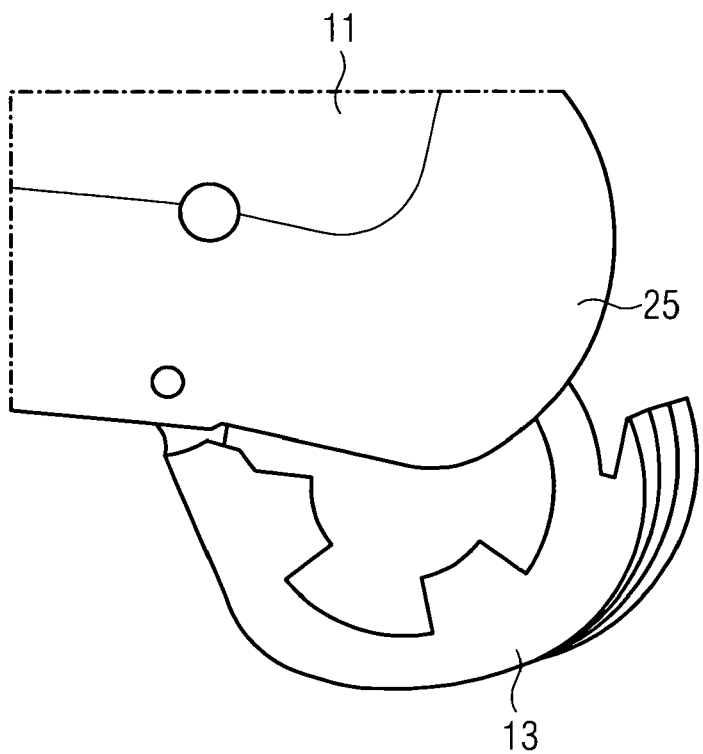

The intermediate position as shown in FIG. 8 can also be used to prevent the battery from falling out of the battery compartment 13. A lower part 25 of the housing is screwed onto or attached to the frame 10 and is flush with the upper part 11 of the housing. The battery compartment 13 is in the engaged intermediate position (cf. also FIGS. 3 and 7) and part of the lower part 25 of the housing protrudes into the space formed by the axial projection of the battery. This is also the case on the other side of the battery compartment, although this is not visible in FIG. 8. The battery thus cannot be removed from, or fall out of, the battery compartment 13.

Figure 9:
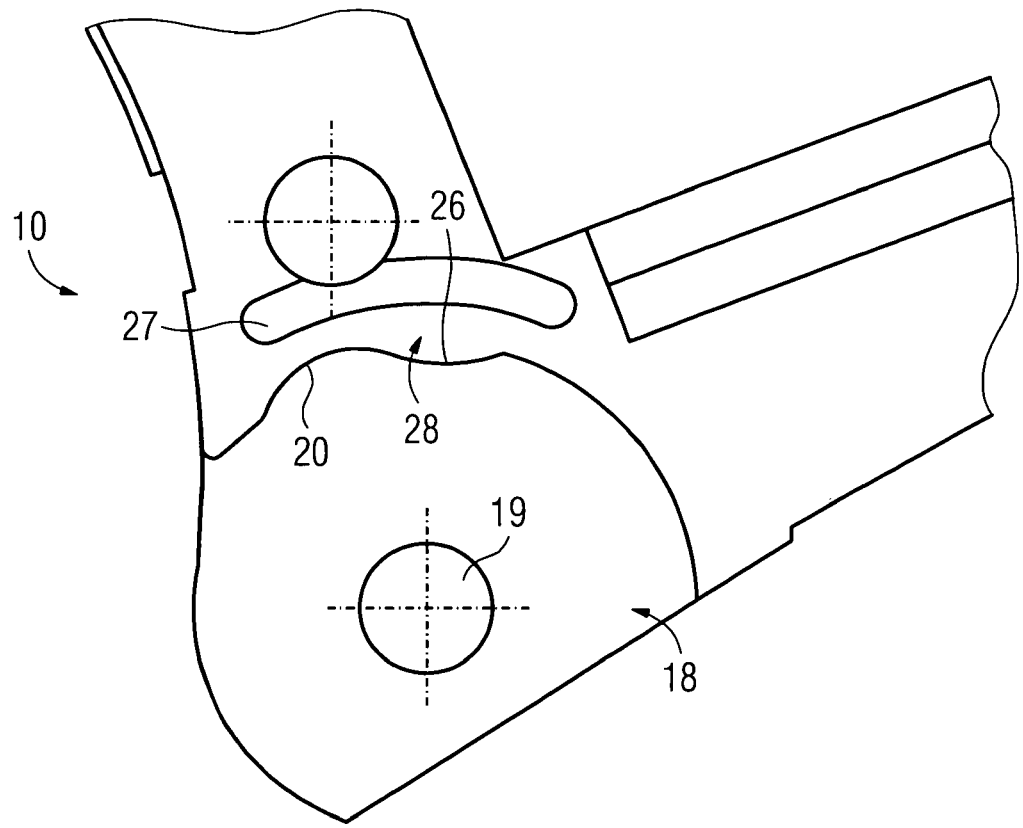
FIG. 9 shows an alternative embodiment of the pivot bearing part for comparison with that of FIG. 5.

A further development of the frame-side part of the locking mechanism is shown in FIG. 9, which shows the section of the frame 10 that is also shown in FIG. 5. The recess 18 of the pivot bearing, including the hole 19 and the depression 20, can be seen here. As has already been shown, the problem with the locking mechanism shown in FIG. 5 is that the friction between the projection 23 of the battery compartment 13 and the raised part 26 or raised parts on the depression 20 lead to abrasion. This can be partially avoided through the use of a softer plastic for the battery compartment 13. However, in order to reduce abrasion further, in accordance with the exemplary embodiment of FIG. 9 a recess 27 is provided radially behind the depression 20 and/or the raised part 26, so that an elastic wall 28 is produced between the recesses 18 and 27, which bears the raised part 26. Thus if the locking mechanism is overtightened, the elastic wall 28 can yield in a radial direction relative to the pivot bearing, so that the friction between the projection 23 and the raised part 26 and thus also the abrasion of the raised part 26 can be reduced.

The invention claimed is:

1. A hearing apparatus, comprising:
   a housing;
   a battery compartment with a ring-shaped mounting element to rotatably mount the battery compartment in or on the housing around an axis of rotation, said ring-shaped mounting element having a center coinciding with the axis of rotation of the battery compartment, the battery compartment rotatable between an open position and a closed position, a first intermediate position provided between the open position and the closed position;
   a first locking element arranged within the battery compartment and radially relative to the axis of rotation along an outer periphery of the ring-shaped mounting element; and
   a second locking element arranged on the housing to allow the first locking element to engage with the second locking element in a rotated position of the battery compartment,
   wherein the rotated position of the battery compartment in which the engagement is allowed is at the first intermediate position.

2. The hearing apparatus as claimed in claim 1, wherein the second locking element is a depression on the housing and the first locking element is a projection that corresponds to the depression.

3. The hearing apparatus as claimed in claim 2, wherein at least a portion of the depression is an elastic wall that is movable in a spring-like manner by the projection in a radial direction relative to the axis of rotation.

4. The hearing apparatus as claimed in claim 1,
   wherein the first locking element is made of a first plastic,
   wherein the second locking element is made of second plastic, and
   wherein the first plastic is softer than the second plastic.

5. The hearing apparatus as claimed in claim 1,
   wherein when the battery compartment is in the open position a battery is removable from the battery compartment in an axial direction relative to the axis of rotation, and
   wherein when the battery compartment is in the closed and first intermediate positions the battery is prevented from being removed.

6. The hearing apparatus as claimed in claim 5, wherein when the battery compartment is in the first intermediate position the battery is prevented from being removed by a part of the housing.

7. The hearing apparatus as claimed in claim 1,
   wherein when the battery compartment is in the open position a battery is removable from the battery compartment in an axial direction relative to the axis of rotation, and
   wherein when the battery compartment is in the closed and first intermediate positions the battery is prevented from being removed.

8. The hearing apparatus as claimed in claim 7, wherein when the battery compartment is in the first intermediate position the battery is prevented from being removed by a part of the housing.

9. The hearing apparatus as claimed in claim 7, further comprising:
   a contact,
   wherein when the battery compartment is in the closed position the battery contacting the contact in order to supply a power to the hearing apparatus, and
   wherein when the battery compartment is in the open and first intermediate positions the battery in not contacting the contact and thus the hearing apparatus is turned off.

10. The hearing apparatus as claimed in claim 1, further comprising:
    a third locking element arranged on the housing to allow the first locking element to engage with the third locking element in a second intermediate position,
    wherein the second intermediate position differs from the first intermediate position.

11. The hearing apparatus as claimed in claim 1, further comprising:
    a third locking element arranged on the battery compartment to allow the second locking element to engage with the third locking element in a second intermediate position,
    wherein the second intermediate position differs from the first intermediate position.

12. A hearing apparatus, comprising:
    a frame;
    a battery compartment with a ring-shaped mounting element to rotatably mount the battery compartment in or on the frame around an axis of rotation, said ring-shaped mounting element having a center coinciding with the axis of rotation of the battery compartment, the battery compartment rotatable between an open position a closed position, an first intermediate position provided between the open position and the closed position;
    a first locking element arranged on the battery compartment and radially relative to the axis of rotation; and
    a second locking element arranged on the frame to allow the first locking element to engage with the second locking element in a rotated position of the battery compartment,
    wherein the rotated position of the battery compartment in which the engagement is allowed is at the first intermediate position, and wherein the battery compartment having a ring-shaped mounting element, the center of which runs the axis of rotation.

13. The hearing apparatus as claimed in claim 12, wherein the first locking element is a projection arranged on an outer periphery of the ring-shaped mounting element, and
wherein the second locking element is a depression on the housing that corresponds to the projection.

14. The hearing apparatus as claimed in claim 2, wherein at least a portion of the depression is an elastic wall that is movable in a spring-like manner by the projection in a radial direction relative to the axis of rotation.

15. The hearing apparatus as claimed in claim 12, further comprising:
a contact,
wherein when the battery compartment is in the closed position the battery contacting the contact in order to supply a power to the hearing apparatus, and
wherein when the battery compartment is in the open and first intermediate positions the battery in not contacting the contact and thus the hearing apparatus is turned off.

16. The hearing apparatus as claimed in claim 14, wherein the first locking element is made of a first plastic,
wherein the second locking element is made of second plastic, and
wherein the first plastic is softer than the second plastic.

17. A hearing apparatus, comprising:
a frame;
a battery compartment with a ring-shaped mounting element to rotatably mount the battery compartment in or on the frame around an axis of rotation, said ring-shaped mounting element having a center coinciding with the axis of rotation of the battery compartment, the battery compartment rotatable between an open position a closed position, a first intermediate and a second intermediate position provided between the open position and the closed position;
a first locking element arranged on the battery compartment and radially relative to the axis of rotation along an outer periphery of the ring-shaped mounting element; and
a second locking element arranged on the frame to allow the first locking element to engage with the second locking element in the intermediate position of the battery compartment; and
a third locking element:
the third locking element arranged on the frame to allow the first locking element to engage with the third locking element in the second intermediate position of the battery compartment or
the third locking element arranged on the battery compartment radially relative to the axis of rotation to allow the second locking element to engage with the third locking element in the second intermediate position of the battery compartment,
wherein the battery compartment having a ring-shaped mounting element, the center of which runs the axis of rotation.

18. The hearing apparatus as claimed in claim 7, wherein when the battery compartment is in the intermediate position the battery is prevented from being removed by a part of the frame.

19. The hearing apparatus as claimed in claim 14,
wherein each locking element arranged on the battery compartment is made of a first plastic,
wherein each locking element arranged on the frame element is made of second plastic, and
wherein the first plastic is softer than the second plastic.

* * * * *